US008103503B2

(12) United States Patent
Duncan

(10) Patent No.: US 8,103,503 B2
(45) Date of Patent: Jan. 24, 2012

(54) SPEECH RECOGNITION FOR DETERMINING IF A USER HAS CORRECTLY READ A TARGET SENTENCE STRING

(75) Inventor: Duncan, Camano Island, WA (US)

(73) Assignee: Microsoft Corporation, Redmond, WA (US)

( * ) Notice: Subject to any disclaimer, the term of this patent is extended or adjusted under 35 U.S.C. 154(b) by 1110 days.

(21) Appl. No.: 11/933,448

(22) Filed: Nov. 1, 2007

(65) Prior Publication Data

US 2009/0119107 A1 May 7, 2009

(51) Int. Cl.
G10L 15/22 (2006.01)
G09B 19/04 (2006.01)

(52) U.S. Cl. .................... 704/251; 704/255; 434/185

(58) Field of Classification Search ............... 704/251, 704/257, 270, 255; 434/156, 157, 185, 320
See application file for complete search history.

(56) References Cited

U.S. PATENT DOCUMENTS

| 4,032,710 | A | | 6/1977 | Martin et al. |
| 5,634,086 | A | * | 5/1997 | Rtischev et al. ............... 704/270 |
| 5,794,195 | A | | 8/1998 | Hormann et al. |
| 5,885,083 | A | * | 3/1999 | Ferrell .......................... 434/156 |
| 5,920,838 | A | * | 7/1999 | Mostow et al. ............... 704/255 |
| 6,324,509 | B1 | | 11/2001 | Bi et al. |
| 6,347,300 | B1 | * | 2/2002 | Minematsu ................... 704/270 |
| 6,405,168 | B1 | | 6/2002 | Bayya et al. |
| 6,763,331 | B2 | | 7/2004 | Wakita et al. |
| 6,865,528 | B1 | * | 3/2005 | Huang et al. ...................... 704/9 |
| 6,952,675 | B1 | | 10/2005 | Tahara et al. |
| 7,158,930 | B2 | | 1/2007 | Pentheroudakis et al. |
| 7,233,891 | B2 | | 6/2007 | Bond et al. |
| 7,240,002 | B2 | | 7/2007 | Minamino et al. |
| 7,401,018 | B2 | * | 7/2008 | Yamada et al. ............... 704/251 |
| 7,433,819 | B2 | * | 10/2008 | Adams et al. .................. 704/251 |
| 7,917,352 | B2 | * | 3/2011 | Seto ................................... 704/8 |
| 2002/0156632 | A1 | * | 10/2002 | Haynes et al. ................ 704/270 |
| 2002/0160341 | A1 | * | 10/2002 | Yamada et al. ............... 434/157 |
| 2003/0093275 | A1 | | 5/2003 | Polanyi et al. |
| 2005/0033574 | A1 | | 2/2005 | Kim et al. |
| 2005/0055209 | A1 | | 3/2005 | Epstein et al. |
| 2006/0058999 | A1 | * | 3/2006 | Barker et al. .................. 704/256 |
| 2007/0055514 | A1 | * | 3/2007 | Beattie et al. ................. 704/235 |
| 2007/0100635 | A1 | | 5/2007 | Mahajan et al. |
| 2007/0162284 | A1 | * | 7/2007 | Otani ............................. 704/260 |
| 2008/0140412 | A1 | * | 6/2008 | Millman et al. .............. 704/270 |
| 2008/0177545 | A1 | * | 7/2008 | Li et al. ......................... 704/255 |

OTHER PUBLICATIONS

Jelinek, et al., "Decision Tree Parsing using a Hidden Derivation Model", 1994, IBM Research Division, pp. 272-277.

* cited by examiner

*Primary Examiner* — Martin Lerner
(74) *Attorney, Agent, or Firm* — Alleman Hall McCoy Russell & Tuttle LLP

(57) ABSTRACT

Systems and methods for processing a user speech input to determine whether the user has correctly read a target sentence string are provided. One disclosed method may include receiving a sentence array including component words of the target sentence string and processing the sentence array to generate a symbolic representation of the target sentence string. The symbolic representation may include a subset of words selected from the component words of the target sentence string, having fewer words than the sentence array. The method may include processing user speech input to recognize in the user speech input each of the words in the subset of words in the symbolic representation of the target sentence string. The method may further include, upon recognizing the subset of words, making a determination that the user has correctly read the target sentence string.

14 Claims, 3 Drawing Sheets

SPEECH RECOGNITION FOR DETERMINING IF A USER HAS CORRECTLY READ A TARGET SENTENCE STRING

BACKGROUND

Employing speech recognition features in interactive education computer games and other software tends to enhance user interactivity and the overall user experience. However, current methods for performing speech recognition attempt to recognize each word of an entire sentence. This is computationally expensive and difficult to implement, especially on handheld mobile devices, which in general have central processing units (CPU) of limited capabilities. In addition, current speech recognition methods are computationally cost prohibitive to combine with already computationally expensive computer games. Furthermore, since each word must be recognized before a sentence is recognized, current methods are not suited for performing speech recognition with small children, who tend to be noisy or play in noisy areas, which can interfere with recognition of one or more words of a sentence. Lastly, current methods tend to err by producing false negatives; that is, the current methods are more likely not to recognize correctly spoken speech than to recognize incorrectly spoken speech by a user, which tends to discourage the user, making the user experience unpleasant and thwarting acquisition of reading skills.

SUMMARY

Systems and methods for processing a user speech input to determine whether the user has correctly read a target sentence string are provided. One disclosed method may include receiving a sentence array including component words of the target sentence string and processing the sentence array to generate a symbolic representation of the target sentence string. The symbolic representation may include a subset of words selected from the component words of the target sentence string, having fewer words than the sentence array. The method may include processing user speech input to recognize in the user speech input each of the words in the subset of words in the symbolic representation of the target sentence string. The method may further include, upon recognizing the subset of words, making a determination that the user has correctly read the target sentence string.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
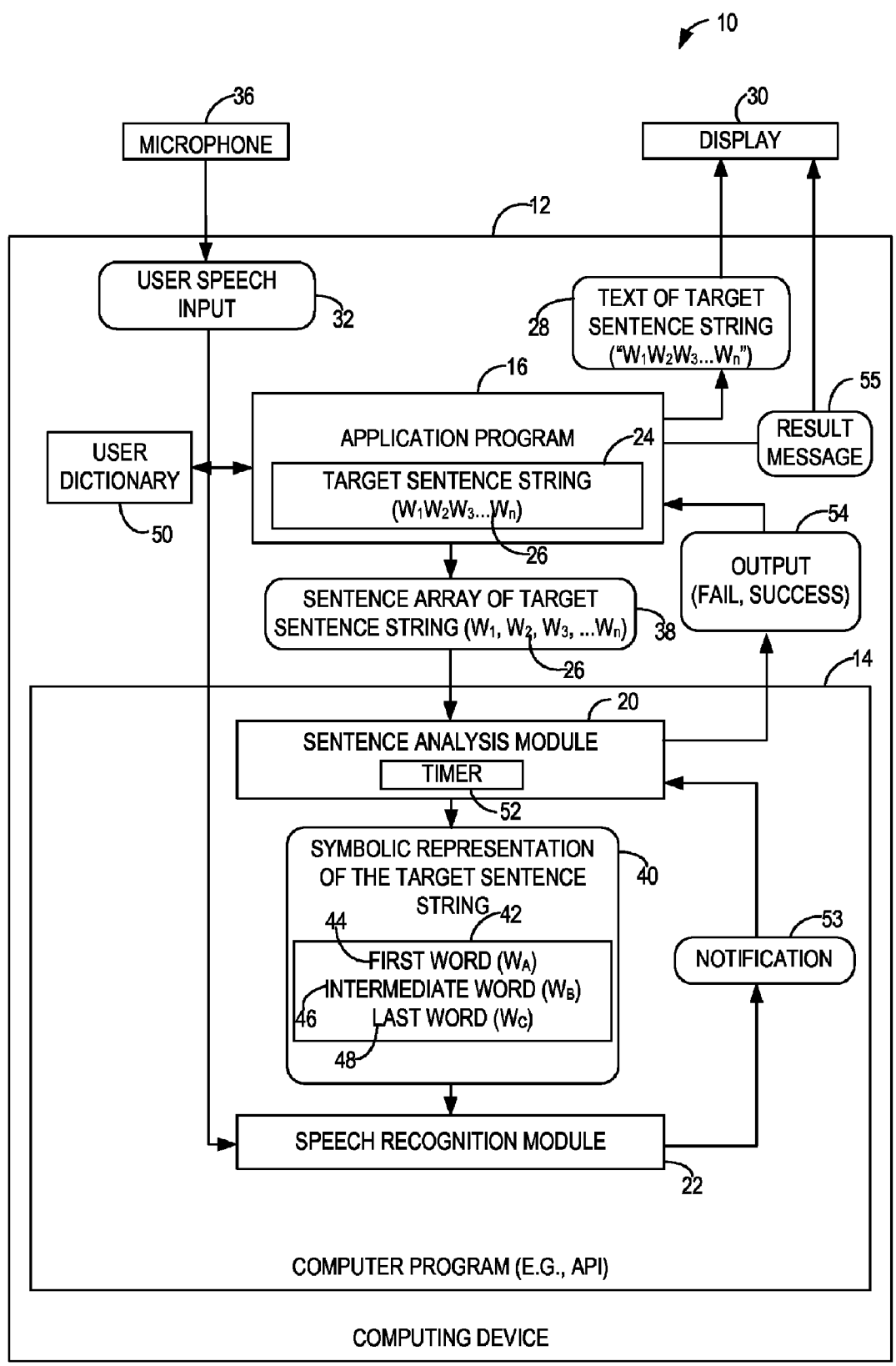
FIG. 1 is a schematic diagram illustrating a system for processing user speech input to determine whether the user has correctly read a target sentence string.

FIG. 1 illustrates a system 10 for processing user speech input of a user. The system 10 may include a computer program 14 configured to be executed on a computing device 12. The computer program 14 may be configured as an application programming interface (API) accessible by an application program 16. Alternatively, the computer program 14 may be a stand-alone program, embedded code, etc., configured to communicate with the application program 16. The computer program 16 may include a sentence analysis module 20 and a speech recognition module 22, which interact to determine whether the user has correctly read a target sentence string, as described below.

The application program 16, which may be a role-playing education computer game program for teaching a user to read, or other computer software, may include a target sentence string 24 having a plurality of component words 26. The application program 16 may generate a text 28 of the target sentence string 24 to be displayed on a display 30 for viewing by the user. The user may attempt to read the text 28 and generate a user speech input 32 via a user input device, such as a microphone 36, which is associated with the computing device 14 and is configured to record the user speech input 32.

It will be appreciated that as used herein the term "sentence" is used to refer not only to complete sentences, but also incomplete sentences and phrases, whether grammatically correct or incorrect. Thus, example target sentence strings may include "TWO ROADS DIVERGED IN A YELLOW WOOD", "ONE NINE EIGHT FOUR", "FOUR SCORE AND SEVEN YEARS AGO", etc.

The application program 16 may generate a target sentence string 24 including a plurality of component words 26, represented by $W_1 W_2 W_3 \ldots W_n$, and instruct the user to read the target sentence string out loud. An example target sentence string 24 may be "THIS DOOR IS THE WAY TO SUCCESS". The application program 16 may be configured to parse the target sentence string and generate a sentence array 38, as represented by $W_1, W_2, W_3 \ldots W_n$, of the target sentence string 24, the sentence array 38 including each component word 26 of the target sentence string 24. An example sentence array may be THIS, DOOR, IS, THE, WAY, TO, SUCCESS. The application program 16 may be further configured to output the sentence array 38 to the sentence analysis module 20.

The sentence analysis module 20 may be configured to receive the sentence array 38 from the application program 16 and generate a symbolic representation 40 of the target sentence string 24. The sentence analysis module 20 may then pass the symbolic representation 40 to the speech recognition module 24 for further processing. The symbolic representation 40 may include a subset of words 42 of the sentence array 24, the subset of words 42 having fewer words than the sentence array 24. The subset of words 42 may include a first word 44 of the target sentence string 24, an intermediate word 46 selected from a plurality of intermediate words of the target sentence string 24, and a last word 48 of the target sentence string 24. For example, the following symbolic representation THIS, DOOR, SUCCESS may be generated by the sentence analysis module 20 from the sentence array THIS, DOOR, IS, THE, WAY, TO, SUCCESS.

To address the possibility of a user attempting to guess the intermediate word 46, the intermediate word 46 may be a random intermediate word randomly chosen from a plurality of intermediate words of the target sentence string 24. In some examples, the system 10 may further include a user dictionary 50 of known words including words known to the user, and the intermediate word 46 may be selected from the plurality of intermediate words of the target sentence string 24 that are not in the user dictionary 50 of known words.

The speech recognition module 22 may be configured to receive the user speech input 32 from the microphone 36, and receive the symbolic representation 40 from the sentence analysis module 16. The speech recognition module 22 may be configured to process the user speech input 32 to recognize in the user speech input 32 the subset of words 42 in the symbolic representation 40 of the target sentence string 24.

The speech recognition module may be further configured to send a notification 53 to the sentence analysis module 20 upon recognizing one or more of the subset of words in the symbolic representation of the target sentence string. The sentence analysis module 20 may be configured to make a determination that the user has correctly read the target sentence string 24 upon receiving the notification from the speech recognition module 22, and send an output 54 indicating whether the user has correctly read the target sentence string 24 to the application program 16. The output 54 may be a message indicating that recognition of the symbolic representation 40 of the target sentence string 24 failed (e.g., "FAIL") and the recognition process must be restarted, or that the recognition was successful (e.g., "SUCCESS"). Upon receiving the output 54, the application program 16, in turn, may be configured to send a result message 55 (e.g., such as "SUCCESS" or "TRY AGAIN") to the display, to inform the user whether the sentence was determined by the sentence analysis module to be correctly read out loud.

To aid in determining whether the target sentence string was correctly read, the sentence analysis module 20 may further include a timer 52 configured to measure a predetermined time interval within which one or more of the words of the subset of words 42 of the symbolic representation 40 is to be recognized. In one embodiment, the sentence analysis module 20 may be configured to determine whether all words in the subset of words 42 were recognized within the predetermined time interval. In another embodiment, the sentence analysis module 20 may be configured to determine whether a next word in the subset of words 42 is recognized within the predetermined time interval. If the word or words are not recognized within the predetermined time interval measured by the timer 52, then the sentence analysis module 20 is configured to send as output 54 a "FAIL" message to the application program 16 to instruct the application program 16 that it may restart listening for the subset of words 42 of the symbolic representation 40. If the word or words are determined to be recognized within the predetermined time interval, then the sentence analysis module 20 is configured to send as output 54 a "SUCCESS" message to the application program 16.

Figure 2:
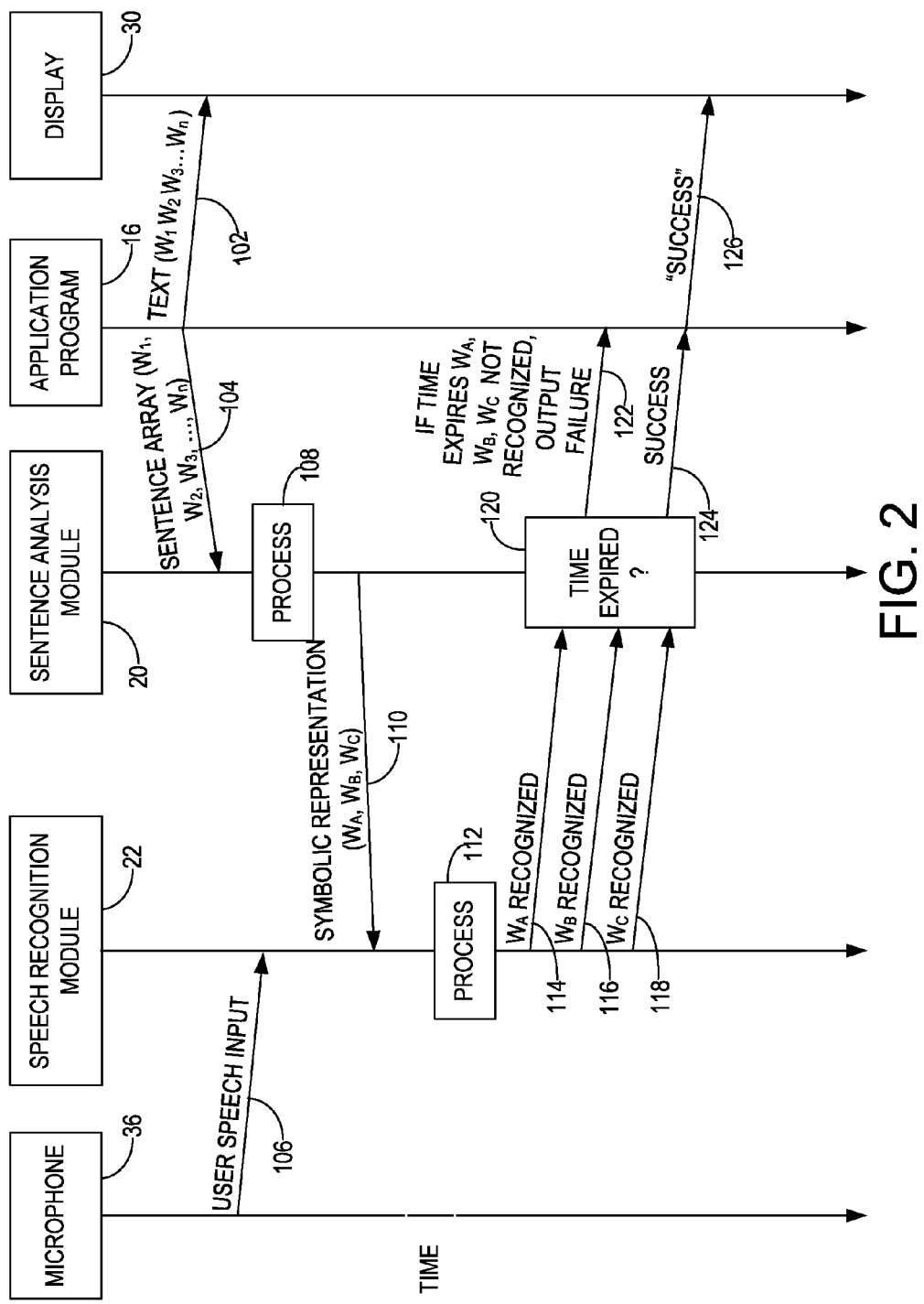
FIG. 2 is a diagram illustrating an example communications between components of the system of FIG. 1.

FIG. 2 illustrates a communications diagram illustrating communications between the various components of the system 10 of FIG. 1. At 102, the application program 16 may generate a text of a target sentence string, as represented by $W_1$ $W_2$ $W_3$ ... $W_n$, to be passed to the display 30 to be displayed. At 104, the application program 16 may generate and pass a sentence array, as represented by $W_1$, $W_2$, $W_3$ ... $W_n$, to the sentence analysis module 20.

At 106, the user may attempt to read out loud the target sentence string according to the displayed text, sending user speech input to the speech recognition module 22 from the microphone 36.

At 108, the sentence analysis module 20 may process the sentence array received from the application program 16 to generate a symbolic representation of the target sentence string. At 110, the sentence analysis module 20 may output the symbolic representation of the target sentence string to the sentence recognition module 22. The symbolic representation of the target sentence string may include, for example, a subset of words, as represented by $W_A$, $W_B$, $W_C$, the subset of words having fewer words than the sentence array, which are selected as described above.

At 112, the sentence recognition module may process user speech input to recognize in the user speech input the subset of words in the symbolic representation. At 114, the sentence recognition module may attempt to recognize a first word of the subset of words, as represented by $W_A$. At 116, the sentence recognition module may attempt to recognize an intermediate word of the subset of words, as represented by $W_B$. At 118, the sentence recognition module may attempt to recognize a last word of the subset of words, as represented by $W_C$.

At 120, the speech recognition module 22 may attempt to determine whether one or more of the subset of words is recognized within a predetermined time interval. In some embodiments all of the words are to be recognized within the predetermined time interval. In other embodiments a time interval within which each word is to be recognized is set and once a first word is recognized the timer restarts for a next word.

At 122, the sentence analysis module 20 may send an output to the application program 16 to indicate that the user has not correctly read the target sentence string, if the subset of words is not recognized by the speech recognition module 22 within the corresponding predetermined time intervals.

At 124, the sentence analysis module 20 may send an output to the application program 16 to indicate that the user has correctly read the target sentence string, if each word of the subset of words is successfully recognized by the speech recognition module 22 within the applicable predetermined time intervals. At 126, a message indicating that the user has correctly read the target sentence string may be sent by the application program 16 to the display 30.

In one specific example of the use of the system 10 of FIG. 1, during a play session, a user may encounter an obstacle, such as a closed door. The application program 16 may pass a text of a target sentence string "THIS DOOR IS THE WAY TO SUCCESS" to be displayed on the display 30 of the computing device. The target sentence string is to be read correctly before the door can be opened for the user to proceed further. The user may attempt to read the text out loud and generate a user speech input via the microphone 36 associated with the computing device 12 on which the application program 16 is executed.

A sentence array 38 of the target sentence string "THIS, DOOR, IS, THE, WAY, TO, SUCCESS" may be generated by the application program 16 and passed to the sentence analysis module 20. The sentence analysis module 20 may receive the target sentence string 24 and generate a symbolic representation THIS, DOOR, SUCCESS. The symbolic representation 40 may then be passed to the speech recognition module 22 for further processing.

The speech recognition module 22, upon receiving the user speech input from the microphone 36 and the symbolic representation from the sentence analysis module 20, may process the user speech input 32 to attempt to recognize the symbolic representation THIS, DOOR, SUCCESS, and may sent a notification to the sentence analysis module upon successful recognition of each word.

The sentence analysis module 20 may determine whether each word (or all words) of the symbolic representation was recognized within any applicable predefined time interval(s). If the sentence analysis module 20 determines that the speech recognition module 22 failed to recognize the symbolic representation within the applicable predefined time interval(s), the sentence analysis module 20 may send a FAIL output to the application program 16 indicating that the user failed to correctly read the target sentence string and the recognition process must be restarted. On the other hand, if the sentence analysis module 20 determines that the speech recognition module 22 successfully recognizes the symbolic representation, it may output SUCCESS to the application program 16 indicating that the user has successfully read the target sentence string. Upon receiving a success output, the application program 16 may send a "SUCCESS" message for display on the display associated with the computing device on which the application program is executed. The application program 16 may then proceed and allow the user to pass to the next challenge, etc., as appropriate.

Figure 3:
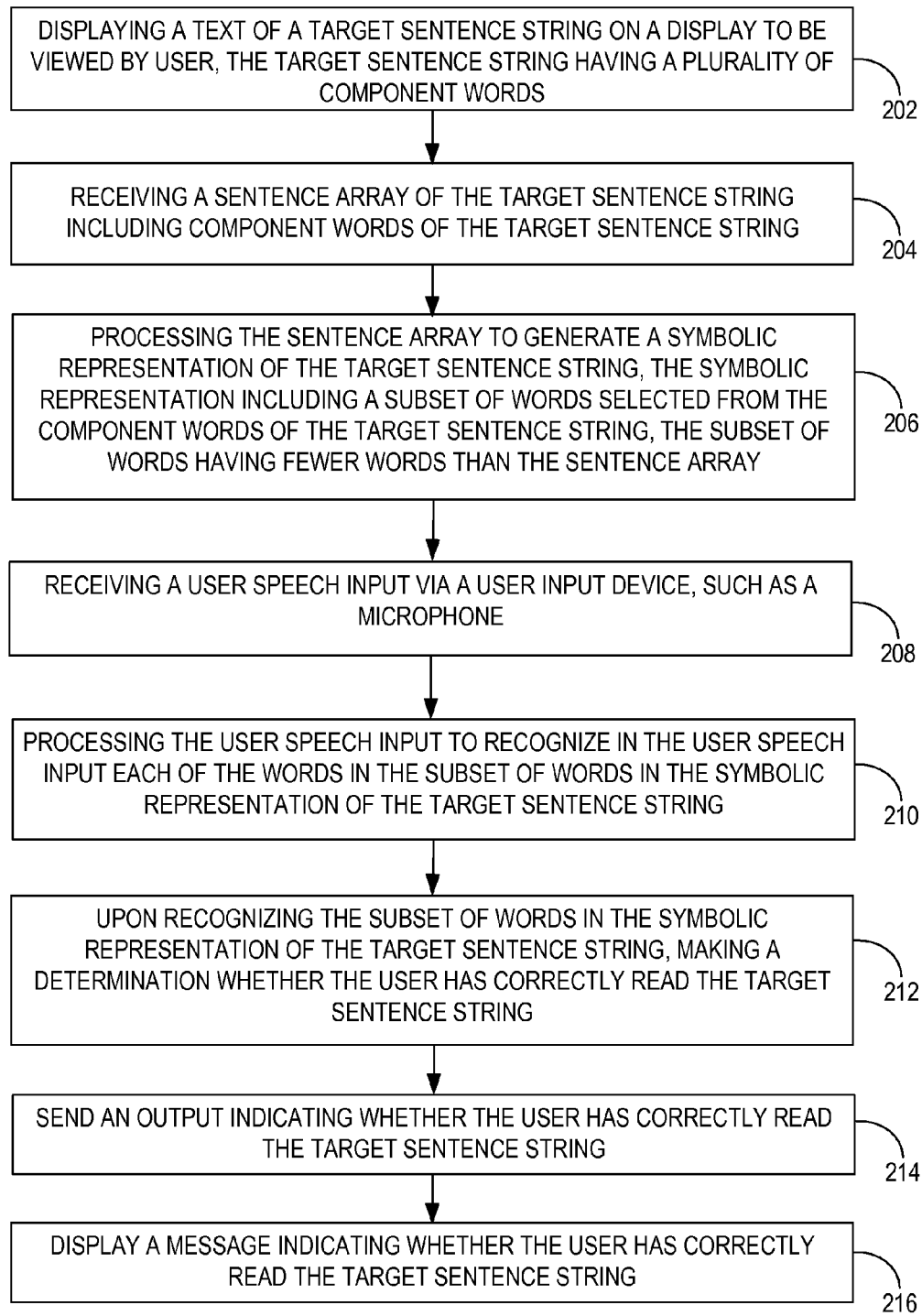
FIG. 3 is a flowchart of an embodiment of a method for processing user speech input to determine whether the user has correctly read a target sentence string.

FIG. 3 is a flowchart of an embodiment of a method 200 for processing user speech input to determine whether a user has correctly read a target sentence string, which may be implemented by the system 10 of FIG. 1 or by other suitable hardware. The method 200 may include at 202, displaying a text of a target sentence string on a display to be viewed by user, the target sentence string having a plurality of component words.

At 204, the method may include receiving a sentence array of the target sentence string including the plurality of component words of the target sentence string. At 206, the method may include processing the sentence array to generate a symbolic representation of the target sentence string. The symbolic representation may include a subset of words selected from the component words of the target sentence string, the subset of words having fewer words than the sentence array. For example, the subset of words may include a first word of the target sentence string, an intermediate word of the target sentence string, and a last word of the target sentence string. The intermediate word may be a random intermediate word randomly chosen from a plurality of intermediate words of the target sentence string, or may be selected by another suitable manner.

In some examples, the method may further include maintaining a user dictionary of known words including words known to the user, and selecting the intermediate word from the plurality of intermediate words of the target sentence string that are not in the user dictionary of known words.

At 208, the method may include receiving user speech input via a microphone. At 210, the method may include processing the user speech input to recognize in the user speech input each of the words in the subset of words in the symbolic representation of the target sentence string. Processing the user speech input may include recognizing each of the words in the subset of words in series and/or in parallel, as described above. Alternatively or in addition, processing the user speech input may include recognizing one or more of the words in the subset of words in a predefined time interval. For example, the predefined time interval may apply to recognition of a next word in the subset of words, or to all words in the subset of words.

At 212, upon recognizing the subset of words in the symbolic representation of the target sentence string, the method may include making a determination whether the user has correctly read the target sentence string.

At 214, upon making a determination that the user has correctly read the target sentence string, the method may include sending an output indicating whether the user has correctly read the target sentence string. As discussed above, the output may be sent from an application programming interface to an application program. At 216, the method may include displaying a message indicating whether the user has correctly read the target sentence string on a display device.

The above described systems and methods may be employed to efficiently and accurately conduct speech recognition and determine whether a user has correctly read a sentence, without consuming the processing time required to recognize each word in the sentence.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

In one variation, for example, speech recognition module 22 and the sentence analysis module 20 may be included within the application program 16.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method for determining whether a user has correctly read a target sentence string, comprising:
    receiving a sentence array including component words of the target sentence string;
    using a computing device, processing the sentence array to generate a symbolic representation of the target sentence string, the symbolic representation including a subset of words selected from the component words of the target sentence string, the subset of words having fewer words than the sentence array;
    receiving user speech input;
    using the computing device, processing the user speech input to recognize in the user speech input each of the words in the subset of words in the symbolic representation of the target sentence string, the subset of words including a first word of the target sentence string, an intermediate word of the target sentence string, and a last word of the target sentence string, wherein the intermediate word is a random intermediate word randomly chosen from a plurality of intermediate words of the target sentence string; and
    upon recognizing the subset of words in the symbolic representation of the target sentence string, making a determination whether the user has correctly read the target sentence string.

2. The method of claim 1, wherein processing the user speech input includes recognizing each of the words in the subset of words in series.

3. The method of claim 1, wherein processing the user speech input includes recognizing each of the words in the subset of words in parallel.

4. The method of claim 1, wherein processing the user speech input includes recognizing one or more of the words in the subset of words in a predetermined time interval.

5. The method of claim 4, wherein all words in the subset are determined to be recognized within the predetermined time interval.

6. The method of claim 4, wherein a next word in the subset is determined to be recognized within the predetermined time interval.

7. The method of claim 1, further including displaying a text of the target sentence string in a display to be read by the user.

8. A system for processing user speech input of a target sentence string having a plurality of component words, the system comprising computer-readable medium encoded with a computer program configured to be executed on a computing device, the computer program including:
   a sentence analysis module configured to receive a sentence array from an application program, the sentence array including each word of the target sentence string, the sentence analysis module being configured to generate a symbolic representation of the target sentence string, the symbolic representation including a subset of words of the sentence array, the subset having fewer words than the sentence array, the subset including a first word of the target sentence string, an intermediate word selected from a plurality of intermediate words of the target sentence string, and a last word of the target sentence string, wherein the intermediate word is a random intermediate word randomly chosen from the plurality of intermediate words of the target sentence string; and
   a speech recognition module configured to receive the user speech input from a microphone and the symbolic representation from the sentence analysis module, and to process the user speech input to recognize in the user speech input the subset of words in the symbolic representation of the target sentence string.

9. The system of claim 8,
   wherein the speech recognition module is further configured to send a notification to the sentence analysis module upon recognizing one or more of the subset of words in the symbolic representation of the target sentence string; and
   wherein the sentence analysis module is configured to make a determination that the user has correctly read the target sentence string upon receiving the notification from the speech recognition module.

10. The system of claim 9, wherein the sentence analysis module and speech recognition module are included within an application programming interface accessible by an application program executed on the computing device.

11. The system of claim 9, wherein the sentence analysis module further includes a timer configured to measure a predetermined time interval within which one or more of the words of the subset of words is to be recognized.

12. The system of claim 11, wherein the sentence analysis module is configured to determine whether all words in the subset of words were recognized within the predetermined time interval.

13. The system of claim 11, wherein the sentence analysis module is configured to determine whether a next word in the subset of words was recognized within the predetermined time interval.

14. A method for determining whether a user has correctly read a target sentence string, comprising:
   receiving a sentence array including component words of the target sentence string;
   using a computing device, processing the sentence array to generate a symbolic representation of the target sentence string, the symbolic representation including a subset of words selected from the component words of the target sentence string, the subset of words having fewer words than the sentence array;
   receiving user speech input;
   using the computing device, processing the user speech input to recognize in the user speech input each of the words in the subset of words in the symbolic representation of the target sentence string, the subset of words including a first word of the target sentence string, an intermediate word of the target sentence string, and a last word of the target sentence string;
   upon recognizing the subset of words in the symbolic representation of the target sentence string, making a determination whether the user has correctly read the target sentence string; and
   maintaining a user dictionary of known words including words known to the user;
   wherein the intermediate word is selected from a plurality of intermediate words of the target sentence string that are not in the user dictionary of known words.

* * * * *